(12) United States Patent
Doyle et al.

(10) Patent No.: US 10,593,169 B2
(45) Date of Patent: Mar. 17, 2020

(54) VIRTUAL MANAGER WITH PRE-DEFINED RULES TO GENERATE AN ALERT IN RESPONSE TO A SPECIFIED EVENT

(71) Applicant: EVERSEEN LIMITED, Blackpool, Cork (IE)

(72) Inventors: Gavin Doyle, Ovens (IE); Alan O'Herlihy, Blarney (IE)

(73) Assignee: EVERSEEN LIMITED, Blackpool, Cork (IE)

( * ) Notice: Subject to any disclaimer, the term of this patent is extended or adjusted under 35 U.S.C. 154(b) by 70 days.

(21) Appl. No.: 14/421,698

(22) PCT Filed: Aug. 15, 2013

(86) PCT No.: PCT/EP2013/067093
§ 371 (c)(1),
(2) Date: Feb. 13, 2015

(87) PCT Pub. No.: WO2014/027070
PCT Pub. Date: Feb. 20, 2014

(65) Prior Publication Data
US 2015/0221191 A1   Aug. 6, 2015

(30) Foreign Application Priority Data

Aug. 15, 2012   (IE) .................................. S2012/0354

(51) Int. Cl.
*G08B 21/00*   (2006.01)
*G08B 13/00*   (2006.01)
(Continued)

(52) U.S. Cl.
CPC ............. *G08B 13/00* (2013.01); *G06Q 10/06* (2013.01); *G06Q 10/0639* (2013.01);
(Continued)

(58) Field of Classification Search
CPC .... G06Q 10/06; G06Q 10/0639; G06Q 10/08; G07F 19/207; G07G 1/14; G07G 3/003; G08B 13/00
(Continued)

(56) References Cited

U.S. PATENT DOCUMENTS 7,631,808 B2   12/2009   Kundu et al.
2003/0191709 A1 *   10/2003   Elston .................... G06Q 20/04
705/40
(Continued)

FOREIGN PATENT DOCUMENTS

EP   2299416 A2   3/2011
WO   2011092044 A2   8/2011

OTHER PUBLICATIONS

International Search Report issued in PCT/EP2013/067093, dated Oct. 30, 2013.

*Primary Examiner* — Mark S Rushing

(57) ABSTRACT

A virtual management system comprises video cameras, and various other sensors that acquire event data indicative relating to the processing of stock. This data is passed to a local data collection device that aggregates the event data and passes it via a network to a number of remote data processing modules. The event data is allocated to each of the data processing modules based upon their assigned tasks by a virtual manager agent. A data processing module receives the aggregated event data from the local data collection device via a network and processes the event data according to a set of pre-defined rules. The data processing module generates an alert in response to the processing of the event data indicating that a pre-defined event has occurred, and transmits the alert to a remote device associated with an employee.

12 Claims, 2 Drawing Sheets

(51) Int. Cl.
   *G07G 1/14* (2006.01)
   *G06Q 10/06* (2012.01)
   *G07F 19/00* (2006.01)
   *G06Q 10/08* (2012.01)
   *G07G 3/00* (2006.01)

(52) U.S. Cl.
   CPC ........... *G06Q 10/08* (2013.01); *G07F 19/207* (2013.01); *G07G 1/14* (2013.01); *G07G 3/003* (2013.01)

(58) Field of Classification Search
   USPC ..................................................... 340/568.1
   See application file for complete search history.

(56) References Cited

U.S. PATENT DOCUMENTS

| | | | |
|---|---|---|---|
| 2006/0244588 A1* | 11/2006 | Hannah | A47F 10/04 340/539.13 |
| 2007/0139212 A1* | 6/2007 | Kaundinya | G06Q 10/06 340/692 |
| 2007/0203809 A1* | 8/2007 | Bapat | G06Q 10/087 705/28 |
| 2008/0303902 A1 | 12/2008 | Romer et al. | |
| 2010/0134624 A1 | 6/2010 | Bobbitt et al. | |
| 2010/0134625 A1 | 6/2010 | Bobbitt et al. | |
| 2010/0274691 A1* | 10/2010 | Hammad | G06Q 20/3221 705/30 |
| 2011/0063108 A1 | 3/2011 | Aonuma et al. | |
| 2013/0127639 A1* | 5/2013 | Hassanzadeh Toreh | G08G 1/09 340/905 |
| 2014/0009620 A1 | 1/2014 | Bobbitt et al. | |

\* cited by examiner

VIRTUAL MANAGER WITH PRE-DEFINED RULES TO GENERATE AN ALERT IN RESPONSE TO A SPECIFIED EVENT

TECHNICAL FIELD

The present invention relates to a virtual manager. More specifically, but not exclusively, it relates to a retail virtual manager. Even more specifically, but not exclusively, it relates to an intelligent remote retail virtual manager.

BACKGROUND ART

Retailers encounter a large number of factors which server to reduce their profitability, in particular their gross margin. One non-limiting example of factors which adversely affect profitability, include "sweethearting" where a customer pays for a low value item whilst purchasing a high value item with the collusion of the checkout assistant, or at a self-service checkout terminal. Another non-limiting example is where the layout of a retail unit is such that it is not customer friendly, resulting in poor sales of stock items that would otherwise realise higher sales in an alternative position within the retail unit.

In order to address these issues it is common practice to employ a team of managers to cover all opening hours of a retail unit. This practice is expensive for the retail unit owner and does not address the case where one, or more, of the team of managers is indulging in the fraudulent activity and is therefore not likely to address the fraudulent activity.

Attempts have been made to correlate point-of-sale (POS) terminal outputs with video surveillance footage in order to identify fraudulent activity such as sweethearting, see for example U.S. Pat. No. 7,631,808 B (STOPLIFT, INC). However, these POS-video correlations merely identify fraudulent activity and do not add further value to the retailer, there is no attempt to further increase the gross margin associated with a retail unit by identifying further issues with, for example the retail unit's layout.

Additionally, the prior art solutions identify that a problem has occurred but do not automatically identify the reoccurrence of problem that may be indicative of a failure of a manager to address the issue(s).

Naturally, the cost and complexity of addressing gross margin issues increases with the estate of the retailer, for example a large retailer may divide their estate into regions under regional managers reporting in to an overall manager who reports to the chief executive. The present attempts to identify fraudulent transactions do not address how to escalate notification of problems to the appropriate person within retailer, for example the escalation from a regional manager to a general manager if a problem is seen to be recurrent within a particular region, but not in other regions. Thus, in prior art systems there is no correlation between the nature and occurrence of an issue and its escalation through the retailer's organisational hierarchy.

DISCLOSURE OF INVENTION

According to a first aspect of the present invention there is provided a virtual management system comprising: at least one data acquisition device arranged to acquire event data indicative of an event at a location; a local data collection device arranged to aggregate the event data; at least one data processing module arranged to receive the aggregated event data from the local data collection device via a network, and being further arranged to process the event data according to a set of pre-defined rules; the at least one data processing module being further arranged to generate an alert in response to the processing of the event data indicating that a predefined event has occurred, and being further arranged to transmit the alert to a remote device associated with an employee.

The rules may comprise at least one escalation rule related to the escalation of the alert through a management hierarchy. The at least one escalation rule may be related to escalating the alert based upon at least one of the following: a delay in entering a response to the alert at a, or the, remote device, an increased frequency of the event, the reoccurrence of the event. The at least one escalation rule may be related to at least one of the following: a particular retail unit, area within a retail unit, a group of retail units, a geographical area, a person, group of persons, a relationship between persons, a time period.

The rules may be arranged to identify clusters of events. The clusters may be geographically linked, temporally linked, technologically linked, and/or linked to one or more persons, and/or one or more business factors. Business factors may include, by way of non-limiting example only, footfall, spend per customer, customer satisfaction, type of goods purchased.

The rules may comprise dynamically variable rules. The dynamically variable rules may comprise machine-learning algorithms.

The at least one data processing module may be arranged to compare an event identified by the rules to stored model event data. The at least one processing module may be arranged to update parameters associated with the model event data in response to the comparison. The at least one processing module may be arranged to selectively generate the alert based upon the comparison.

The at least one data acquisition device comprises at least one of the following: a POS terminal, a video camera, a radio-frequency identification (RFID) tag, an electronic price label (EPL), a location sensor, an audio sensor, an accelerometer, a magnetometer, an electrometer, an electro-optical sensor, a tactile sensor, a piezoelectric sensor, a heat sensor, a proximity sensor, any other suitable sensor for detecting any of the following: position, speed, heat, presence of an object, position, angle, distance, displacement, electrical field, electromagnetic field, gravitational field, force, density, direction, flow properties, for example but not limited to, flow of people, chemical sensor, environmental sensor, for example but not limited to weather sensor.

The at least one data processing module may comprise a rule arranged to identify a correlation between POS physical event data and video event data which corresponds to an indication of a fraudulent transaction. The at least one data processing module may comprise a rule arranged to identify a correlation between POS physical event data, video event data and input from at least one sensor and/or other input device, which corresponds to an indication of a fraudulent transaction. Physical event data may include, by way of non-limiting example only, POS transaction data.

The system may comprise a plurality of data processing modules. The plurality of data processing modules may be distributed geographically. Differing data processing modules may be arranged to process different portions of the aggregated event data. Typically, the differing portions of the event data may relate to differing event types.

Each location has an instance of a virtual manager agent associated with it, the virtual manager agent being arranged to control the application of the rules and the generation of the alert. The virtual manager agent may be arranged to control the escalation of the alert through the management hierarchy. The virtual manager agent may be run on the at least one data processing module, or it may be instantiated across a plurality of the data processing modules.

According to a second aspect of the present invention there is provided a virtual management system data processing unit comprising: a transceiver arranged to control the flow of data to and from the data processing unit; a processor arranged to receive, via the transceiver at least a portion of event data acquired from at least one data acquisition device; the processor being further arranged to process the event data according to a set of pre-defined rules, being arranged to generate an alert in response to the processing of the event data indicating that a predefined event has occurred, and being further arranged to transmit the alert to a remote device associated with an employee, via the transceiver.

The rules may be stored locally at a storage device of the processing unit.

The rules may comprise at least one escalation rule related to the escalation of the alert through a management hierarchy. The at least one escalation rule may be related to escalating the alert based upon at least one of the following: a delay in entering a response to the alert at a, or the, remote device, an increased frequency of the event, the reoccurrence of the event. The at least one escalation rule may be related to at least one of the following: a particular retail unit, a group of retail units, a geographical area, a person, a time period.

The rules may be arranged to identify clusters of events. The clusters may be geographically linked, temporally linked and/or linked to one or more persons.

The rules may comprise dynamically variable rules. The dynamically variable rules may comprise machine-learning algorithms. The processor may be arranged to update the rules in response to event data.

The processor may be arranged to compare an event identified by the rules to stored model event data. The processor may be arranged to update parameters associated with the model event data in response to the comparison. The processor may be arranged to selectively generate the alert based upon the comparison.

The processor may have an instance of a virtual manager agent associated with a retail store running thereupon, the virtual manager agent being arranged to control the application of the rules and the generation of the alert. The virtual manager agent may be arranged to control the escalation of the alert through a management hierarchy. The virtual manager agent may be run on the at least one data processing module, or it may be instantiated across a plurality of the data processing modules.

According to a third aspect of the present invention there is provided a method of managing a retail store virtually comprising: acquiring event data indicative of an event within the retail store at at least one data acquisition device; receiving aggregated event data from a data collection device at a data processing module via a network; processing the event data according to a set of pre-defined rules; generating an alert in response to the processing of the event data indicating that a predefined event has occurred at the at least one data processing module; and transmitting the alert to a remote device associated with an employee.

The method may further comprise escalating of the alert through a management hierarchy. The method may further comprise escalating the alert based upon at least one of the following: a delay in entering a response to the alert at a, or the, remote device, an increased frequency of the event, the reoccurrence of the event. The method may further comprise escalating the alert based upon at least one of the following: a particular retail unit, a group of retail units, a geographical area, a person, a time period.

The method may comprise identifying clusters of events. The clusters may be geographically linked, temporally linked and/or linked to one or more persons.

The method may comprise varying the rules dynamically. The dynamically variable rules may comprise machine-learning algorithms.

The method may comprise comparing an event identified by the rules to stored model event data. The method may comprise updating parameters associated with the model event data in response to the comparison. The method may comprise selectively generating the alert based upon the comparison.

The method may comprise identifying a correlation between POS event data and video event data that corresponds to an indication of a fraudulent transaction. The method may comprise identifying a correlation between POS event data, video event data and input from at least one sensor and/or other input device that corresponds to an indication of a fraudulent transaction.

The method may comprise instantiating an instance of a virtual manager agent associated with a particular retail store, the virtual manager agent being arranged to control the application of the rules and the generation of the alert. The method may comprise controlling the escalation of the alert through a management hierarchy via the virtual manager agent. The method may comprise instantiating a portion a virtual manager agent associated with a particular retail store on the at least one data processing module.

According to a fourth aspect of the present invention there is provided software, which when executed upon a processor, causes the processor to act as the processor of the processing unit of the second aspect of the present invention.

According to a fifth aspect of the present invention there is provided a retail manager agent which, when executed upon a processor, causes the processor to act as the retail management unit of any one of the first, second or third aspects of the present invention.

BRIEF DESCRIPTION OF DRAWINGS

The invention will now be described, by way of example only, with reference to the accompanying drawings, in which.

DETAILED DESCRIPTION

Figure 1:
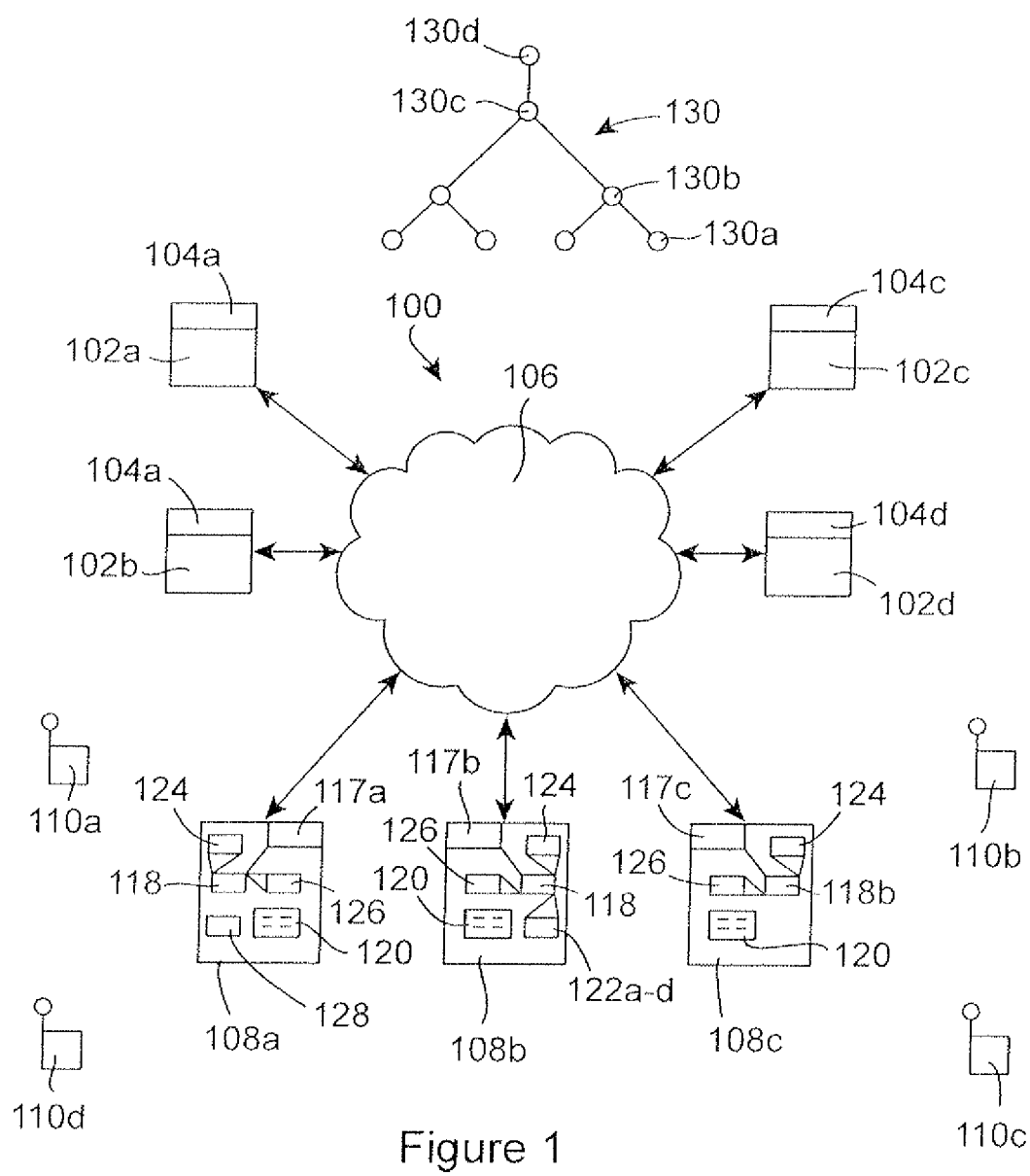
FIG. 1 is a schematic diagram of an embodiment of virtual retail management system in accordance with at least one aspect of the present invention.
Figure 2:
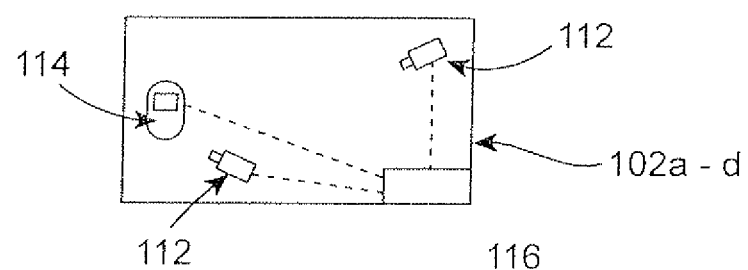
FIG. 2 is a schematic diagram of a store deploying the virtual retail management system of FIG. 1.

Referring now to FIGS. 1 and 2, a virtual retail management system 100 comprises a plurality of stores 102a-d each having a respective virtual manager agent 104a-d associated with it, a network 106, a number of data analysis modules 108a-c and a number of remote terminals 110a-d associated with employees of a retailer who owns the stores 102a-d. Typically, a remote terminal 110a-d will comprise a mobile telephone, a tablet, a PC or a laptop.

Each of the stores 102a-d comprises a closed circuit television (CCTV) system 112 and at least one POS terminal 114. Data acquired from the CCTV system 112 and the POS terminal 114 is fed to an in-store data aggregator 116. The aggregator 116 collates all video and POS data relating to transactions. Additionally, or alternatively, the aggregator 116 collects data relating to stocking levels of shelves, EPL and/or RFID data relating to prices and sales of goods. In at least one embodiment, the correlation of video data from areas of the store 102 along any one or combination of stocking levels, EPL or RFID data allows for the interdependence of sales and store layout to be monitored by subsequent data processing of this data for correlations.

Each data analysis module 108a-c comprises a transceiver 117, a processor 118 and a rules database 120. The processor 118 of at least one of the data analysis module 108a-c runs a respective store retail manager agent 122a-d for each store 102a-d, and data analysis application 124. Additionally, or alternatively, the processor 118 runs a machine-learning algorithm 126. It will be appreciated that in some embodiments the rules database 120 resident on each data analysis module 108a-c may be a direct copy of that present on at least one other data analysis module, or it may be tailored for a particular aspect of data analysis.

It will be appreciated that there is typically one retail management agent 122a-d for each store and this may be located on one of the data analysis modules 108a-c that controls the processing of the aggregated data across the data analysis modules 108a-c. Alternatively, the retail management agent 122a-d can be distributed across the data analysis modules 108a-c.

In use, the aggregated data is received at one of the data analysis modules 108a-c where the retail management agent 122 assigns parts or all of the aggregated data to the data analysis modules 108a-c for analysis. In at least one embodiment, the machine learning algorithm 126 analyses the aggregated data for any previously unknown patterns within the data, or for patterns that deviate slightly from those already defined in the rules database 120. The machine learning algorithm 126 records these data patterns for incorporation into the rules database 120, should the data pattern be identified as corresponding to an event that is to be monitored in the future.

The processor 118 runs an incident analysis routine that analyses the collated POS and CCTV data in order to establish patterns that correspond to an incident. Typically, the incident analysis routine is a video content analysis routine. In one non-limiting example, the change in movement of a scanned item associated with a "sweethearting" within CCTV data can be cross-referenced with the scan of a low value item at a POS to determine that an event of "sweethearting" is likely to occur. The rules database 120 is accessed during this analysis such that any number of models of stored event types can be compared to the data to provide a rich analysis of the data beyond merely identifying "sweethearting".

In at least one embodiment, the retail management agent 122 is provided with data structures which details for example any of the following the management structure, staff rosters, layout, stock levels and historical sales data of each store 102a-d. This allows, for example, an analysis to be carried out as to which employees are present when an event occurs and/or which areas of the store 102a-d are most susceptible to stock loss etc.

The above detailed usage of the system provides an overview of the situation of a single store. However, in many retail operations the estate extends over a multiplicity of store locations, for example the four stores of FIG. 1 may be divided into two regions. The processor 118 receives processed data relating to each store 102a-d from its respective retail management agent 122 and runs an intelligent organisational modelling (IOM) routine in relation to the processed data. The IOM routine collates all of the processed data to establish patterns within it, for example the stores 102a,b which form Region 1 may show a high incidence of "sweethearting", whilst the stores 102c,d which form Region 2 may not. However, for example, the stores of Region 2 102c,d may show high proportions of stock loss of alcoholic beverages where as the stores of Region 1 show none. Such regional, national or even store level patterns can be established. The establishment of these patterns allows for their inclusion into further rules to be introduced into the rules database once the cause of these patterns has been correlated to an action or type of incident. For example, inner city stores may be found to have a higher incidence of stock loss due to theft and rural stores may be more prone to "sweethearting". Once established as such the relative thresholds for flagging the two incidents in the respective types of stores can be accurately and intelligently set by the software, and dynamically monitored and altered by the software as more data becomes available over time to improve the accuracy of detection.

Once the IOM routine has analysed the data it generates output alerts that are to be sent to a data communication elevator (DCE) 128 which 128, which is also resident upon the data analysis modules 108a-c. The DCE 128 contains a detailed breakdown of the retailer's management hierarchy 130. The DCE 128 determines which level of management should be informed of an incident dependent upon, for example the severity of the incident. For example, a single instance of "sweethearting" may be deemed suitable for reporting to a store manager 130a, in order that they can deal with it. However, a repeated instance of stock loss from a storeroom may be considered suitable for reporting to a regional manager 130b, as it cannot be guaranteed that a store duty manager, or overall manager was not complicit. In an extreme case, the DCE 128 may elevate an alert directly to the chief executive officer, or owner, 130d of the retail group.

Furthermore, the DCE 128 actively retains historic data and compares real-time data with such historic data. This allows for trends in incidents to be established and for appropriate elevation or demotion of the level of management hierarchy 130 to which an alert is directed. For example, the failure to address an issue that is prevalent in a region by a regional manager may be escalated to an operations manager 130c. Conversely, where a regional manager 130b was being sent alerts related to an issue within in his area alerts relating to this issue can be demoted to local managers 130a, where there are only localised instances of the issue occurring, indicating that the regional problem has been adequately addressed.

Once the correct level of management hierarchy has been addressed an alert is issued to the remote device associated with the manager concerned via the transceiver 117 and a suitable network. For example, for a mobile telephone a GSM, CDMA or UTMS network can be employed and for a laptop etc., the Internet and where appropriate a wireless network.

Figure 3:
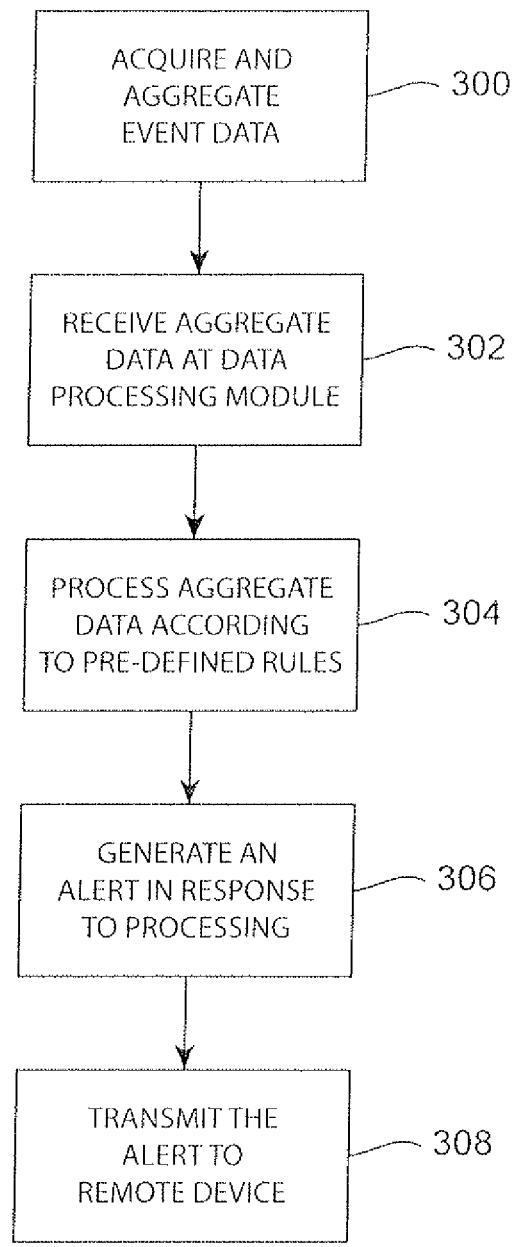
FIG. 3 is a flow chart detailing an embodiment of a method of managing a retail store virtually in accordance with another aspect of the present invention.

Referring now to FIG. 3, a method of managing a retail store virtually comprises acquiring event data indicative of an event within the retail store 102a-d from a CCTV system 112 and a POS terminal 114 (Step 300). The aggregated event data is received from an in-store data collection at a data processing module 108a-c via a network (Step 302). The event data is processed according to a set of pre-defined rules (Step 304). An alert is generated in response to the processing of the event data indicating that a specified event has occurred at the data processing module 108a-c (Step 306). The alert is transmitted to a remote device associated with an employee associated with the retail store 102a-d (Step 308).

In at least one embodiment, the method comprises escalating of the alert through a retailer's management hierarchy prior to its being sent.

It will be appreciated that although described with reference to "rules" the "rules" may be applied in the form of any of the following: threshold, frequency, and/or decision making algorithms.

It will be appreciated that the term "employee" as used herein is intended to encompass a business owner or any third party granted access to the output of the virtual retail management system described herein.

Typically, each module comprises a processor to enable the module to perform its function, and a communications facility to enable the module to communicate with outside entities, but in some instances this may not be essential.

It will also be appreciated that the steps of the methods described herein may be carried out in any suitable order, or simultaneously where appropriate. The methods described herein may be performed by software in machine-readable form on a tangible storage medium or as a propagating signal.

Various modifications may be made to the above described embodiment without departing from the spirit and the scope of the invention.

The invention claimed is:

1. A virtual management system data processing unit comprising:
   a transceiver arranged to control a flow of data to and from the data processing unit;
      a processor for receiving, via the transceiver, at least a portion of event data acquired from at least one local data acquisition device, the processor, in response to a set of pre-defined rules, operable to:
      analyse the event data;
      compare the event data to the set of predefined rules, and based on the comparison indicating that a specified event has occurred;
      generate an alert; transmit the alert to a remote device associated with an employee, via the transceiver; and
      dynamically update the predefined rules in response to the event data by analysing the event data for one or more event patterns and update the predefined rules based on the one or more event patterns;
   wherein prior to transmitting of the alert to the remote device the processor is further operable to, in response to the set of predefined rules, compare an occurrence of the specified event with stored historic data to determine an event trend and select whether to elevate or demote a level of management hierarchy to which the alert is directed based on the event trend.

2. The virtual management system data processing unit according to claim 1, wherein:
   the predefined rules comprise at least one escalation rule related to an escalation of the alert through a management hierarchy, and
   the at least one escalation rule is related to escalating the alert based upon at least one of the following: a delay in entering a response to the alert, an increased frequency of the specified event, or a reoccurrence of the specified event.

3. The virtual management system data processing unit according to claim 2, wherein the at least one escalation rule may be related to at least one of the following: a particular retail unit, a group of retail units, a geographical area, a person, or a time period.

4. The virtual management system data processing unit according to claim 1, wherein the predefined rules are arranged to identify clusters of events.

5. The virtual management system data processing unit according to claim 4, wherein the clusters of events may be geographically linked, temporally linked or linked to one or more persons.

6. The virtual management system data processing unit according to claim 1, wherein the predefined rules comprise dynamically variable rules.

7. The virtual management system data processing unit according to claim 6, wherein the dynamically variable rules comprise machine-learning algorithms.

8. The virtual management system data processing unit according to claim 1, wherein the processor is further operable to, in response to the set of predefined rules, update parameters associated with the one or more event patterns in response to the comparison.

9. The virtual management system data processing unit according to claim 8, wherein the processor is further operable to, in response to the set of predefined rules, selectively generate the alert based upon the comparison.

10. The virtual management system data processing unit according to claim 6, wherein the processor has an instance of a virtual manager agent associated with a retail store running thereupon, the virtual manager agent arranged to control an application of the predefined rules and a generation of the alert.

11. The virtual management system data processing unit according to claim 10, wherein the virtual manager agent is configured to control an escalation of the alert through a management hierarchy.

12. A method of virtually managing stock comprising:
   acquiring event data indicative of an event using at least one local data acquisition device;
   aggregating the event data at a local data collection device;
   receiving the aggregated event data from the local data collection device via a network;
   processing the event data according to a set of predefined rules;
   comparing the event data to the set of predefined rules;
   based on the comparison indicating that a specified event has occurred;
   generating an alert;
   transmitting the alert to a remote device associated with an employee;
   dynamically updating the predefined rules in response to the event data, comprising:
   analysing the event data for one or more event patterns; and
   updating the predefined rules based on the one or more event patterns;
   wherein prior to transmitting of the alert to the remote device, comparing an occurrence of the specified event with stored historic data to determine an event trend and selecting whether to elevate or demote a level of management hierarchy to which the alert is directed based on the event trend.

* * * * *